Oct. 20, 1959
T. L. SEAMON
2,908,995
SPRING-BIASED SOAP EJECTOR
Filed Dec. 6, 1956
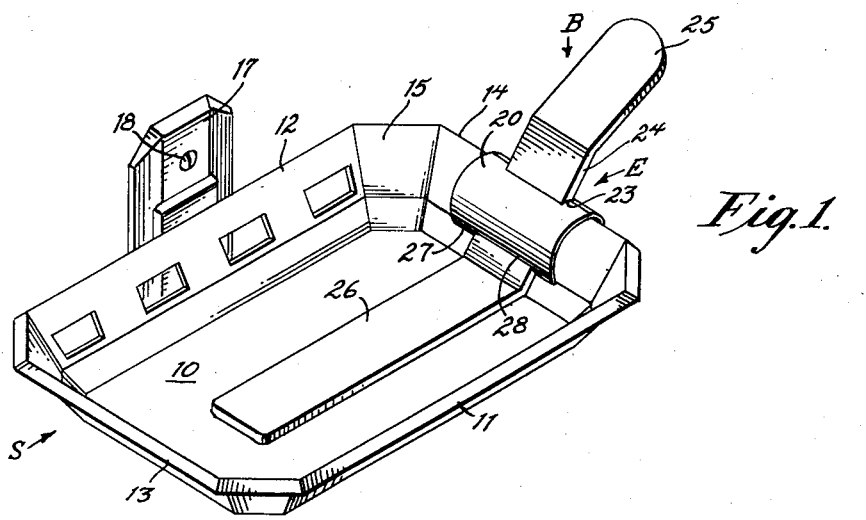
Fig. 1.
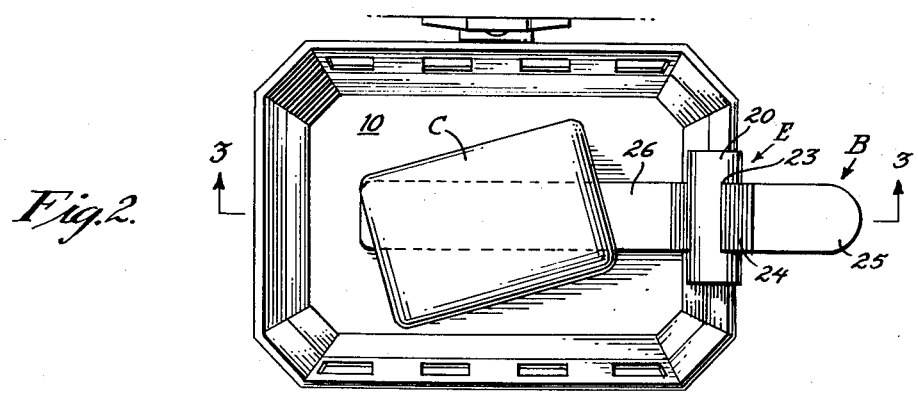
Fig. 2.
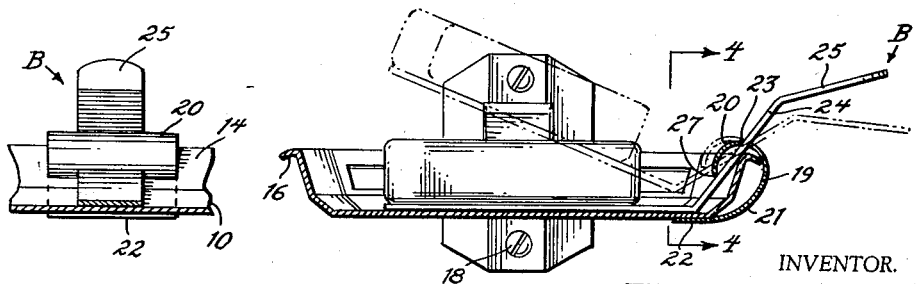
Fig. 4.
Fig. 3.
INVENTOR.
THOMAS L. SEAMON
BY
ATTORNEY

2,908,995
SPRING-BIASED SOAP EJECTOR
Thomas L. Seamon, Philadelphia, Pa.

Application December 6, 1956, Serial No. 626,713

1 Claim. (Cl. 45—28)

The present invention has to do with dishes or receptacles commonly employed about the kitchen or bathroom for the purpose of receiving a cake of soap during those intermediate periods when it is not in use and is concerned primarily with an ejector that is operatively associated with the dish.

At the present time soap in the form of cakes is widely used throughout homes, offices, factories and just about any place that a washroom is located. It is the universal practice to keep a cake of soap in a dish or open receptacle that is mounted on a convenient support in the washroom. During periods of nonuse the soap remains in its dish. When its use is required the user must remove the soap from the dish. It happens that the cake of soap will accumulate moisture from the atmosphere or from previous periods of usage and in this condition exhibits a marked tendency to adhere to the bottom of its dish. This adhesive property is greatly emphasized when the soap has become unduly soft from being permitted to remain in water for long periods.

This tendency of a cake of soap to stick to the bottom of a dish is a highly undesirable factor and when attempt is made to remove a cake having a soft surface from a dish, the body is distorted and marred by the pressure of the fingers which is necessary to accomplish the removal.

With the foregoing conditions in mind, the present invention has in view as its foremost objective the provision of a soap ejector that is adapted to be mounted on a soap dish or receptacle and which may be easily operated to break a cake of soap free from the bottom of the receptacle.

More in detail, the invention has as an object the provision of a soap ejector that consists essentially of a spring clip formed with a slot through which a flat bar passes. Just beyond the line where this bar passes an end edge of the clip it is bent outwardly into the form of a long tongue which is adapted to overlie the upper face of a soap dish. The other end of the bar above the slot is bent outwardly in the opposite direction to provide a handle or operating tab. The clip itself is designed to be fitted over the side wall of a soap dish and normally exerts a tendency to maintain the tongue in engagement with the top face of the dish. However, the operating tab may be depressed against the influence of the spring clip to raise the tongue and thus break the cake of soap free.

While a soap dish may take any of many forms, sizes, and shapes, just about all of them may be characterized as including a flat bottom from which upstands side wall structure and this side wall structure ordinarily will include at least one straight side or end wall on which the soap ejector of this invention is adapted to be mounted.

A further object of the invention is to provide a combination soap dish and ejector in which the soap dish has a straight end wall on which the ejector comprising the spring clip and bar aforesaid is mounted.

Various other more detailed objects and advantages of the invention such as arise in connection with carrying out the above noted ideas in a practical embodiment will in part become apparent and in part be hereinafter stated as the description of the invention proceeds.

The invention, therefore, comprises a soap ejector that is adapted to be mounted on a wall of a soap dish with the ejector consisting of a spring clip formed with a slot and a rod having an inclined portion passing through the slot, a tongue extending outwardly from the lower end of said inclined portion and a handle tab extending outwardly from the upper end of the inclined portion in the opposite direction. The invention also includes the combination of a soap dish with such an ejector.

For a full and more complete understanding of the invention, reference may be had to the following description and accompanying drawing wherein:

Figure 1 is a perspective view of a soap dish having an ejector mounted thereon in accordance with the precepts of this invention.

Figure 2 is a top plan view illustrating the manner in which a cake of soap is received in the dish and over the tongue of the receptacle.

Figure 3 is a longitudinal vertical section taken about on the plane represented by the line 3—3 of Figure 2; and Figure 4 is a detailed transverse vertical section taken about on a plane represented by the line 4—4 of Figure 3.

Referring now to the drawing wherein like reference characters denote corresponding parts, a soap dish is identified in its entirety by the reference character S. It will be understood that the dish S may be made from any of the materials commonly employed in the commercial production of soap dishes. Thus, while in a preferred embodiment it may be of metal, it also could be made of any of the wide field of plastics, porcelain, or other ceramics. However, it may be stated as a general rule that the dish proper will be an integral one-piece affair.

The soap dish S comprises a bottom 10 from the peripheral edges of which upstands a side wall structure. The exact nature of this side wall structure depends, of course, upon the shape of the particular dish. In the soap dish S depicted in the drawing, the side wall structure comprises a front wall 11, a rear wall 12, and end walls 13 and 14. At each corner there is a beveled or corner wall 15.

When the soap dish S is made of sheet metal such as illustrated in the drawing, each of the walls 11 to 15 inclusive will terminate at its upper free edge in an outturned flange 16. Carried by the rear wall 12 is a bracket 17 which will be secured to the rear wall 12 in any preferred manner. This bracket is intended to be used in mounting the soap dish on a wall or other appropriate support and for this purpose the screws shown at 18 will be employed.

The ejector, which is referred to in its entirely by the reference character E, is shown as mounted on the end wall 14. Obviously, it might just as well be mounted on the other end wall or in some instances it might even be mounted on the front wall. The ejector E comprises a spring clip 19 having an upper curved and generally semi-cylindrical portion 20 to which is integrally joined a lower curved portion 21 terminating in an end tab 22 which overlaps the underface of the bottom 10 when the ejector is mounted on the dish S. The upper portion 20 of the clip 19 is formed with a transverse slot 23. A bar B which may be of any appropriate material has a central inclined portion 24 which is received in the slot 23. Integrally joined to the upper end of the inclined portion 24 and extending outwardly therefrom is a handle or operating tab 25. A tongue 26 extends into the dish S and is integrally joined to the lower end of the inclined portion 24 of the bar B. This tongue 26 is normally urged into yielding engagement with the upper face of the bottom 10 by the spring clip 19. It will be noted that the upper portion 20 of the spring clip has a free edge at 27 which is interrupted by a notch 28 that receives the inclined part 24 of the bar B. This notch 28 opposes any tendency of the tongue 26 to wobble or come out of its correct position. It is the bottom edge of the notch 28 which engages the inclined portion 24 under pressure to force the tongue 26 against the bottom of the dish.

*Operation*

While the mode of operation and manner of using the soap ejector of this invention is believed to be obvious from the illustrations of the drawings and descriptions of parts given, they will be briefly outlined as follows:

It will be understood that the ejector E and dish S may be supplied as a unit or the ejector E may be supplied as an accessory to be applied to soap dishes already installed. In any event, with the spring clip 19 in position on the proper wall of the dish it will be effective to normally urge the tongue 26 into engagement with the top face of the bottom of the dish. A cake of soap, such as represented at C in Figure 2, is placed in the dish S on top of the tongue 26. Naturally, the cake of soap will not snugly conform to the size of the dish and it may assume any of various positions therein but in all cases at least a portion of the cake C will overlie a part of the tongue 26.

When a user is desirous of removing the cake C from the dish S, downward pressure is applied to the tab 25. This breaks any adhesive connection of the cake of soap with respect to the dish bottom 10 and enables the user to readily remove the cake as required. Once pressure is relieved from the tab 25, the tongue 26 returns to its normal position.

While a preferred specific embodiment of the invention is hereinbefore set forth, it is to be clearly understood that the invention is not to be limited to the exast constructions, mechanisms and designs illustrated and described because various modifications of these details may be provided in putting the invention into practice within the purview of the appended claim.

What is claimed is:

In combination, a soap dish having a solid flat bottom and an end wall upstanding therefrom; and a soap ejector detachably mounted on said end wall, said ejector comprising a spring clip fitted over said end wall and having an upper curved portion formed with a slot and terminating in a downwardly extending end edge formed with a notch, said spring clip including an outer curved portion terminating in an end tab engaging the under side of said bottom, and a bar having a central inclined portion passing through said slot and received in said notch, a handle tab integrally joined to and extending outwardly from the upper end of said inclined portion, and a solid flat tongue integrally joined to the lower end of said inclined portion and overlying said dish bottom and held against lateral displacement or wobbling by the reception of said bar in said slot and notch.

References Cited in the file of this patent

UNITED STATES PATENTS

| | | |
|---|---|---|
| 570,666 | Huebel | Nov. 3, 1896 |
| 632,220 | Lewis | Aug. 29, 1899 |
| 1,398,592 | Hohnsbeen | Nov. 29, 1921 |
| 1,554,832 | Antelmann | Sept. 22, 1925 |